Reissued Nov. 21, 1944

Re. 22,566

UNITED STATES PATENT OFFICE 22,566

TREATMENT OF WOOLEN TEXTILE MATERIALS

Edwin P. Johnstone, Jr., Glenbrook, and William J. van Loo, Jr., East Port Chester, Conn., assignors to American Cyanamid Company, New York, N. Y., a corporation of Maine Original No. 2,329,622, dated September 14, 1943, Serial No. 409,036, August 30, 1941. Application for reissue September 8, 1944, Serial No. 553,204

8 Claims. (Cl. 117—141)

This invention relates to textiles and their treatment and more particularly to the treatment of wool and wool containing fabrics to reduce their felting, fulling, and shrinking tendencies.

Wool and wool containing fabrics such as loose wool itself, yarns, threads, and woven, felted, and knitted cloth have a very undesirable tendency to felt and shrink when subjected to ordinary washing operations. The tendency of these wool materials to felt and shrink is due generally to a curling and intertwining of the wool fibers as the fabrics are wetted and subjected to the mechanical movements of the washing process. As a result the fabric becomes more closely compacted, thicker, and has a considerably reduced area.

A number of different methods have been proposed for the treatment of wool and woolen fabrics to prevent felting and shrinking but all of these have not been completely satisfactory. Some treatments damage the fiber and reduce its wearing qualities, others impart an undesirable hand to the fabric and some treatments are not permanently effective and may even cause an ultimate increase in shrinkage. Still other shrink-proofing methods are difficult to apply with uniformity and create hazards to the workmen involved in their applications.

We have found that wool and wool containing fabrics such as unwoven wool, yarns, worsteds, flannels, blankets, shirting, felts, knit goods, and others, whether of all wool or of part wool and part silk, synthetic silk, rayon, cotton, etc., may be rendered substantially resistant to felting, fulling, and shrinking by the application thereto of alkylated methylol-melamines such as will be presently described. Our new shrink proofing process may be carried out in a safe, inexpensive, convenient and effective manner without any of the disadvantages of previously known processes.

The alkylated methylol-melamines which we employ in our shrink-proofing process are applied to the woolen goods in the form of solutions of dispersions containing from about 2 or 3 to 15% or more of the alkylated methylol-melamine. We prefer to employ water as the dispersing medium but as some of the higher alkylated methylol-melamines are difficultly water dispersible, it is necessary in such cases to disperse these resins with the aid of solvents such as alcohol. The butylated methylol-melamine employed by us, for example, was dispersible to a resin solids content of about 10% in a 50% water-ethyl alcohol solution. Higher alkylates required a higher proportion of alcohol.

The dispersions of alkylated methylol-melamines may be applied to the woolen fabrics in various ways known to those in the art. The fabric to be treated is first thoroughly cleaned to remove fats and oils, etc. The dry fabric is then immersed in the resin dispersion and passed through suitable rolls as in a padder or mangle to secure uniform impregnation and to remove excess resin. The fabric, however, may be impregnated by other methods such as for example by spraying or with suitable boxes located on the mangle. As our invention is not limited to any particular method of impregnating the wool containing fabric, other methods will occur to those skilled in the art. Since shrink-proofing of woolen fabrics with alkylated methylol-melamine is most effective and economical within the range of about 5 to 15% by weight of resin based on the dried weight of fabric, the liquor pick-up should be governed accordingly.

After the wool has been impregnated with the alkylated methylol-melamine dispersion, it is dried and the resin cured in situ by the application of elevated temperature. In order to speed up the curing of the resin and decrease the heating time a suitable catalyst may be added to the resin dispersion. Such catalysts are known to chemists in the resin art. Oxalic acid, di-ammonium-hydrogen-phosphate and methyl acid pyrophosphate have been used by us with particular good results. Other catalysts such as triethanol amine phthalate, zinc chloride, acetic acid, dilute mineral acids, as HCl, and others have been used with satisfactory results.

The curing temperatures may vary considerably from about 200° F. to about 300° F. with a corresponding reduction in time of cure with increase of temperature. The curing operation is quite flexible, however, and may be varied to suit the equipment available to the process or where facilities do not allow the drying and curing temperatures to exceed 230° F. the fabric after impregnation with the desired alkylated methylol-melamine, may be framed to width, dried, batched up on the shell and allowed to stand hot to obtain a total drying and heating time of at least 45 minutes at 230° F. Where drying temperatures of 250° to 260° F. are available good results may be obtained by drying on the frame for 8 minutes at 250° to 260° F. and then passing the fabric through the drier a second time for 8 minutes at 260° F. Another drying and curing procedure which has given good results is to dry the impregnated fabric on the frame for 8 minutes at 200 to 230° F. and then pass it through a frame or loop drier whereby the fabric will receive heat treatment for 1 to 1½ minutes at 300° F. Drying and curing times will also depend to some extent upon the effectiveness of the particular curing accelerator employed and upon the nature of the fabric.

After the wool fabric has been treated as above described it should be given a short mild soaping before finishing which renders it soft and pliable. The fabric may then be given the usual finishing treatments such as decatizing, brushing, shearing, pressing, etc.

Our process may be employed with colored goods as well as with whites without appreciably affecting the colors or shade and without damage to the material. Tests made on numerous woolen fabrics containing various shades of acid and chrome colors indicate that our alkylated methylol-melamine shrink-proofing process does not affect the shade of the dyed wool. Also, the presence of chrome from bottom, meta-, or top chrome does not appear to affect the shrinkage control obtained. We have also found that our shrink-proofing process has no deleterious effect on fastness to light of dyed wool fabrics. The application of alkylated methylol-melamines according to our process definitely increases the tensile strength of the wool, yarn, or fabrics and no loss of strength was observed following accelerated aging tests.

The alkylated methylol-melamines suitable for use in our process are preferably water dispersible or, as previously mentioned, may be dispersed with the aid of a solvent in order that they may be applied uniformly and economically to the fabric. Although the various alkylated methylol-melamines may be prepared by different processes, we prefer to prepare ours by first obtaining methylol-melamine, a product of the condensation of melamine with formaldehyde, and then reacting this product with a primary alcohol. Ordinarily, we react the melamine formaldehyde condensation product with methyl alcohol thus obtaining methylated methylol-melamine which is easily water dispersible and is the preferred alkylated methylol-melamine of our invention. Various other alkylated melamine-formaldehyde condensation products may be prepared in a similar manner or by reacting the methylated methylol-melamine with other primary alcohols and obtaining by interchange the desired alkylated product. Other alkylating alcohols include ethyl alcohol, propyl alcohol, butyl alcohol, amyl alcohol, octyl alcohol, lauryl alcohol, ethylene glycol, diethylene glycol, propylene glycol and the glycol ethers known to the trade as "Carbitols" such for example being the monobutyl ether of di-ethylene glycol, $$CH_3CH_2CH_2CH_2OCH_2CH_2OCH_2CH_2OH$$

glycerol, pentaerythritol, etc.

The alkylated melamine-formaldehyde condensation products employed by us in the treatment of wool and wool containing fabrics to prevent their felting, fulling and shrinking are prepared by known methods. The melamine-formaldehyde condensation product which we prefer to alkylate is prepared by reacting 2 to 6 mols of formaldehyde with 1 mol of melamine. The condensation product formed is believed to be mostly methylol-melamine. Although it is theoretically possible to react 6 mols of formaldehyde with 1 mol of melamine, this degree of reaction is not always attained due to excessive polymerization of the reaction mixture. Excessive polymerization should be avoided since such products when used tend to make the fabric stiff and boardy.

When preparing the various alkylated methylol-melamines described, we generally prepare first the methylated methylol-melamine and then if it is desired to obtain some other alkylated methylol-melamine we react the methylated product with a primary aliphatic alcohol and by a process of interchange obtain the alkylated product corresponding to the alcohol reacted with the methylated methylol-melamine. This process is illustrated by the following:

960 parts by weight of formalin (37% by weight $CH_2O$) and 252 parts by weight of melamine were charged into a reaction vessel fitted with an agitator, thermometer, and reflux condenser and arranged so that it could be placed under a vacuum and heated. The contents of the reaction vessel were heated in one-half hour to a temperature of 62° C. and the pH adjusted to 7.5 with 2 normal NaOH. After heating for another one-half hour, a vacuum of 28 inches of mercury was applied and the mixture concentrated by removal of water. After 40 minutes heating at approximately 54° C. the heat and vacuum were removed and 1000 parts by weight of methyl alcohol containing enough 2 normal $H_3PO_4$ to neutralize the 2 normal NaOH added previously. The mixture at a pH of 6.4 was then heated to distill off an azeotropic mixture of methanol and water, anhydrous methanol being continuously added to replace the distillate. After heating in this way for about 6 to 7 hours, one part of the distillate would tolerate 100 parts of toluol and the resin was considered dried. It was then concentrated under a vacuum of 28 inches of mercury to a solids content of approximately 50%. The methylated methylol-melamine thus prepared may be dispersed in water to a concentration of 10% resin solids and applied to woolen goods in accordance with our invention.

To prepare the butyl carbitolated methyl-melamine, 600 parts by weight of the above described 50% solution of methylated methylol-melamine and 160 parts by weight of butyl carbitol were mixed and heated to concentrate the mixture to 408 parts by weight, whereupon, a composition consisting of about 75% of the butyl carbolated methylol-melamine was obtained. Ethylated methylol-melamine, butylated methylol-melamine, and the other alkylated methylol-melamines previously described may also be prepared in a similar way.

The shrink-resisting qualities imparted to woolen fabrics as a result of the treatment with alkylated methylol-melamines was demonstrated in a series of tests in which 9" by 23" swatches of a light weight woolen flannel were impregnated with dispersions of the various alkylated methylol-melamines. Aqueous dispersions of methylated methylol-melamine, ethylated methylol-melamine, butylated methylol-melamine and the alkylated methylol-melamine obtained by the reaction of butyl carbitol and methylol-melamine were made up to a concentration of about 10% resin solids. The ethylated methylol-melamine syrup containing 50% resin solids prepared as described above required the addition of about 50% by volume of alcohol to allow dilution with water to a concentration of 10% solids. The butylated methylol-melamine required more. An accelerator, consisting essentially of diammonium hydrogen phosphate was added to the dispersion in amounts corresponding to 3.5% based on the dry weight of the resin. The woolen swatches were then impregnated with these resin solutions and dried on frames while holding them to their original size of 9'' by 23''. The amount of resin based on its dry weight contained in the dry woolen swatches was in each case approximately 10%. The impregnated woolen swatches were then cured for 15 minutes at 260° F. and then washed, with a control sample 9'' by 23'' of the same fabric, in a standard washing machine using a temperature of 120° F. and a ¼% soap concentration. After periods of 15 minutes, 30 minutes, and one hour the swatches were rinsed with warm water, squeezed, and dried flat without tension. The percent of shrinkage after each washing period is shown in the following table:

*Table I*

| Alkylated methylol-melamine | Per cent shrinkage after washing | | |
|---|---|---|---|
| | 15 min. | 30 min. | 60 min. |
| Control sample | 15.3 | 21.0 | 33.3 |
| Methylated methylol-melamine | 2.1 | 2.8 | 4.2 |
| Ethylated methylol-melamine | 2.1 | 2.8 | 4.2 |
| Butylated methylol-melamine | 1.4 | 2.8 | 5.2 |
| Butyl carbitolated methylol-melamine | 2.8 | 3.5 | 3.5 |
| Butyl carbitolated methylol-melamine [1] | 1.4 | 2.1 | 2.1 |

[1] Using 3.5% methyl acid pyrophosphate accelerator.

In a similar test 9'' by 23'' wool swatches were impregnated with approximately 10% by weight of alkylated methylol-melamines from an aqueous dispersion of methylated methylol-melamine, a solution of octylated methylol-melamine in 40% ethyl alcohol and 60% butyl alcohol, and a solution of laurylated methylol-melamine in ethyl alcohol. Methyl acid pyrophosphate in the amount of 4% based on the weight of the dry resin was added to the resin dispersions. The cloth after impregnation with resin was dried and cured for 15 minutes at 260° F. and then washed in a ¼% soap solution at 120° F. for 90 minutes. The fabrics were then rinsed and dried and the following results obtained:

*Table II*

| Alkylated methylol-melamine | Per cent shrinkage after washing 90 minutes |
|---|---|
| Control sample | 40.3 |
| Methylated methylol-melamine | 2.1 |
| Octylated methylol-melamine | 11.6 |
| Laurylated methylol-melamine | 6.8 |

To show the effect of curing conditions upon the shrinkage control obtained with our process a number of samples of woolen fabrics were treated with methylated methylol-melamine in the amount of about 10% by weight of resin solids based on the weight of the fabric and the resin dried and cured in the fabric at different conditions of time and temperature. Diammonium hydrogen phosphate in the amount of 3.5% was employed as the accelerator. The effect of varying the curing conditions is shown in the following table:

*Table III*

| Curing conditions | Per cent shrinkage after washing | | |
|---|---|---|---|
| | 15 min. | 30 min. | 60 min. |
| Control sample | 11.1 | 18.0 | 29.2 |
| 15 min. at 230° F | 2.8 | 3.5 | 4.6 |
| 15 min. at 240° F | 2.1 | 2.8 | 3.5 |
| 15 min. at 250° F | 1.4 | 2.1 | 2.4 |
| 15 min. at 260° F | 1.4 | 2.1 | 2.4 |
| 30 min. at 260° F [1] | 0.42 | 0.83 | 0.83 |

[1] With 4% methyl acid of pyrophosphate as accelerator.

These results show that while very marked reduction in shrinkage may be had with mild curing conditions almost complete control of shrinkage may be had by employing longer periods of curing time and higher temperatures. It is also apparent from the above table as well as from Table I that some accelerators are more effective than others in the process.

The effects of varying percentages of alkylated melamine-formaldehyde condensation product in reducing the shrinkage of wool cloth is shown in Table IV. In this series of tests, 9'' by 23'' wool swatches were impregnated with varying amounts of an aqueous dispersion of methylated methylol-melamine, the fabric dried and heat-cured for 15 minutes at 260° F.

*Table IV*

| Per cent methylated methylol-melamine | Per cent shrinkage after washing | | |
|---|---|---|---|
| | 15 min. | 30 min. | 60 min. |
| Untreated | 11.1 | 18.0 | 29.2 |
| 10% methylated methylol-melamine | 1.4 | 2.1 | 2.4 |
| 5.0% methylated methylol-melamine | 2.1 | 3.5 | 5.5 |
| 2.5% methylated methylol-melamine | 4.2 | 5.5 | 12.5 |

As may be noted in the above table reduction in the resin solids applied to the fabric decreases the shrinkage control very noticeably. Although 2½% by weight of the methylated methylol-melamine in the fabric decreased its shrinkage more than one half, greatly superior results were obtained when the fabric retained 5% and more of the resin.

Although some aspects of our invention have been described in considerable detail it will be apparent that obvious modification thereof may be made within the skill of the art without departing from the scope of the appended claims. Thus for example, a dispersion of methylol-melamine in a suitable primary alcohol, methyl, butyl, octyl, etc., may be applied to the fabric and heated. As a result of this treatment an appreciable amount of alkylated methylol-melamine will be formed in situ and the cloth so treated has, as shown by tests made by us, a fair degree of shrink resistance. Since this is obviously within the spirit of our invention it is intended that it and similar modifications fall within the following claims.

What we claim is:

1. A process of reducing the felting and shrinking tendencies of wool containing fabrics which comprises impregnating a wool containing fabric with an aqueous solution of a water soluble, substantially unpolymerized methylated methylol melamine condensation product the take-up of the aqueous solution being such as to deposit in the fabric from 2½% to 15% by weight based on the dry weight of the fabric of the water soluble methylated methylol melamine condensation product and thereafter subjecting the impregnated fabric to an elevated temperature sufficient to cure the methylated methylol melamine condensation product therein to a substantially water-insoluble condition.

2. A process of reducing the felting and shrinking tendencies of wool containing fabrics which comprises impregnating wool containing fabrics with an aqueous dispersion of a water dispersible substantially unpolymerized ethylated methylol melamine condensation product the take-up of the aqueous dispersion being such as to deposit in the fabric from 2½% to 15% by weight based on the dry weight of the fabric of the water dispersible ethylated methylol melamine condensation product and thereafter subjecting the impregnated fabric to an elevated temperature sufficient to cure the ethylated methylol melamine condensation product therein to a substantially water-insoluble condition.

3. A process of reducing the felting and shrinking tendencies of wool containing fabrics which comprises impregnating a wool containing fabric with an aqueous dispersion of a water dispersible substantially unpolymerized condensation product of the monobutyl ether of diethylene glycol with methylol melamine the take-up of the aqueous dispersion being such as to deposit on the wool containing fabric from 2½% to 15% by weight based on the dry weight of the wool of the said condensation product and thereafter subjecting the impregnated fabric to an elevated temperature sufficient to cure the said condensation product contained in the fabric to a substantially water-insoluble condition.

4. A process of reducing the felting and shrinking tendencies of woolen fabrics which comprises impregnating a wool fabric with an aqueous dispersion of a water dispersible substantially unpolymerized alkylated melamine-formaldehyde condensation product the take-up of the aqueous dispersion being such as to deposit on the wool fabric from 2½% to 15% by weight based on the dry weight of the wool fabric of the alkylated melamine-formaldehyde condensation product and thereafter subjecting the impregnated wool fabric to a temperature within the range of 200° F. to 300° F., to cure the alkylated melamine-formaldehyde condensation product therein to a substantially water-insoluble condition.

5. A wool containing fabric resistant to felting and shrinking containing 2½% to 15% by weight of a heat cured, substantially water-insoluble methylated methylol melamine polymer, said wool containing fabric having been impregnated with an aqueous solution of a water-soluble, substantially unpolymerized methylated methylol melamine in accordance with the method of claim 1.

6. A process of reducing the felting and shrinking tendencies of wool which comprises impregnating clean wool with an aqueous dispersion of a substantially unpolymerized, alkylated methylol-melamine condensation product, the take-up of the dispersion being such as to deposit in the wool from 2½% to 15% by weight based on the dry weight of the wool of the alkylated methylol-melamine condensation product and thereafter drying and heating the impregnated wool at a temperature within the range of 200° F. to 300° F. to polymerize the alkylated methylol-melamine condensation product on the wool to a substantially water-insoluble condition.

7. A process of reducing the felting and shrinking tendencies of woolen textile material which comprises impregnating the clean woolen textile material with an aqueous dispersion of a substantially unpolymerized, alkylated methylol-melamine, the take-up of the dispersion being such as to deposit in the textile material from 2½ to 15% by weight based on the dry weight of the material of the alkylated methylol-melamine and thereafter subjecting the impregnated woolen textile material to an elevated temperature sufficient to cure the said alkylated methylol-melamine contained therein to a substantially water-insoluble condition.

8. Woolen textile material resistant to shrinking containing 2½% to 15% by weight of a heat-cured, substantially water-insoluble, alkylated melamine-formaldehyde condensation product, said textile material having been impregnated with an aqueous dispersion of a substantially unpolymerized, alkylated melamine-formaldehyde condensation product in accordance with the method of claim 7.

EDWIN P. JOHNSTONE, JR.
WILLIAM J. VAN LOO, JR.